May 5, 1931.    N. D. CLARK    1,804,088

PACKING STRUCTURE

Filed Sept. 10, 1929

Inventor

Noah D. Clark

By Clarence A. O'Brien
Attorney

Patented May 5, 1931

1,804,088

UNITED STATES PATENT OFFICE

NOAH D. CLARK, OF CINCINNATI, OHIO, ASSIGNOR OF ONE-HALF TO GEORGE STRUBLE, OF CINCINNATI, OHIO

PACKING STRUCTURE

Application filed September 10, 1929. Serial No. 391,551.

This invention relates to reciprocating pumps, and has more particular reference to a packing structure for the piston rods of the pump.

A still further object of the invention is to provide a packing structure for the purpose above mentioned, wherein the latter comprises metallic compression or sealing rings arranged in a follower mounted on the piston rods.

A still further object of the invention is to provide a packing structure of this nature which will greatly increase the efficiency of the pump and will obviate the necessity of using fiber or hemp packing structure as was heretofore the customary practice.

A still further object of the invention is to provide a packing structure for pressure pumps, which is comparatively simple in construction, consists of but few parts, is positive in operation, thoroughly reliable and efficient in use and otherwise well adapted for the purpose designed.

Other objects and advantages of the invention will become apparent during a study of the following description, taken in connection with the accompanying drawings, wherein:—

Figure 1:
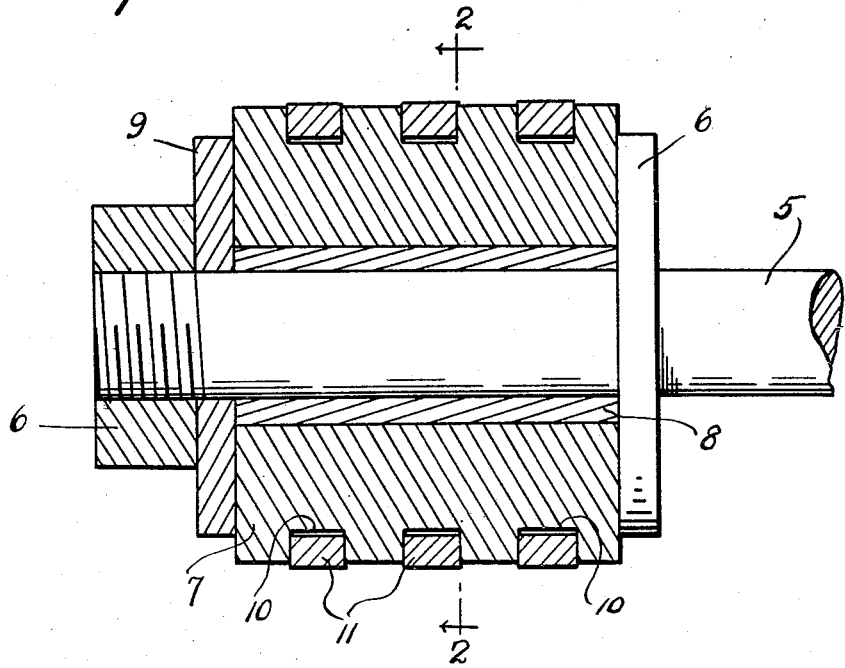
Figure 1 is a vertical longitudinal sectional view of a packing structure constructed in accordance with the present invention, the same being shown as applied to the piston rod of a conventional pressure pump, the rod being shown fragmentarily end elevation.
Figure 2:
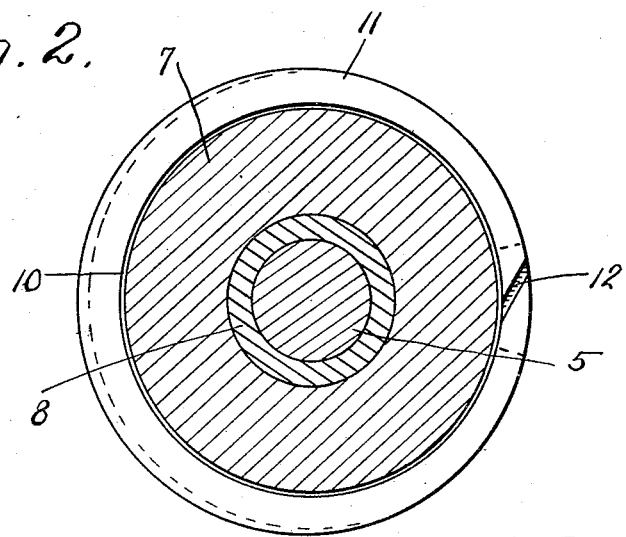
Figure 2 is a vertical transverse sectional view taken substantially on line 2—2 of Figure 1 and looking in the direction of the arrows.

With reference more in detail to the drawing, it will be seen that I have designated the conventional pump piston rod by the reference character 5, the same being threaded at one end and having a lock nut 6 threadedly engaged on said one end. Formed on the piston rod 5 inwardly from the threaded end of the rod is an annular flange or collar 6. A follower member 7 in the nature of a tubular sleeve is mounted on the rod 5 between the threaded end of the rod, and the collar 6. A sleeve bearing 8 being mounted on the rod over which the follower member 7 is arranged. A follower plate 9 is provided with a centrally disposed aperture through which the rod 5 extends, and this follower plate 9 is disposed between the nut 6 and the adjacent end of the sleeve 7 so that obviously when the nut 6 is threaded on the rod 5 the plate 9 will be moved inwardly for maintaining the sleeve 7 rigidly between said plate 9 and the flange or collar 6. The follower sleeve 7 is provided with a plurality of circumferentially extending spaced grooves 10. Arranged within each of the grooves 10 is a packing or compression ring 11. The rings 11 are preferably made of cast iron or bronze, and are of the split type, the adjacent terminals or ends of the rings being stepped as indicated at 12 in Figure 2.

It is believed that from the foregoing description taken in conjunction with the accompanying drawings a clear understanding of the operation, utility and advantages of a packing structure of this nature will be had without a more detailed description thereof.

Even though I have herein shown and described the preferred embodiment of my invention, it is to be understood that the same is susceptible to changes fully comprehended by the spirit of the invention as herein described by the scope of the appended claim.

Having thus described my invention, what I wish to claim as new is:—

In combination, a piston rod, an annular collar formed on said rod, a bearing sleeve mounted on said rod and having one end thereof abutting said collar, a follower sleeve mounted on said bearing sleeve and having one end abutting said collar, a follower plate on said rod abutting the opposite end of said bearing sleeve and follower sleeve, a nut threaded on the rod and bearing against said follower plate, said follower sleeve being of a greater diameter than the diameters of the collar and follower plate respectively, and having a plurality of circumferentially extending spaced grooves formed on the outer periphery thereof, and piston rings in said grooves, said piston rings being of the split type and having their adjacent ends arranged in stepped relation.

In testimony whereof I affix my signature.

NOAH D. CLARK.